Patented Nov. 22, 1927.

1,650,054

UNITED STATES PATENT OFFICE.

MAURICE C. TAYLOR, OF NIAGARA FALLS, NEW YORK, ASSIGNOR TO THE MATHIESON ALKALI WORKS, INC., OF NEW YORK, N. Y., A CORPORATION OF VIRGINIA.

HYPOCHLORITE COMPOSITION.

No Drawing. Application filed August 14, 1926. Serial No. 129,281.

This invention relates to improvements in hypochlorite compositions. The invention provides a composition of improved stability adapted to give, on solution in water, solutions of alkali metal hypochlorites which have several important advantages. The invention also includes an improved method of making alkali metal hypochlorites. Calcium hypochlorite is not entirely satisfactory as a bleaching or disinfecting agent in the presence of soap solutions because of the tendency toward precipitation of calcium soaps. This is a serious disadvantage in many instances, for example in the case of laundries. Similarly, in the use of hypochlorites as surgical disinfectants, the presence of calcium leads to undesirable complications.

To overcome such difficulties, it has hitherto been proposed to employ sodium hypochlorite instead of calcium hypochlorite. For example, solutions of ordinary bleaching powder (containing say 35% of available chlorine) have been treated with sufficient soda ash to precipitate the calcium present as calcium carbonate to form a solution containing sodium hypochlorite and sodium chloride. It has also been proposed to mix soda ash with bleaching powder to form a mixture which will yield a solution of sodium hypochlorite on addition to water, but mixtures of this type have proven to be unstable.

United States Letters Patent No. 1,481,003 also describes the use of mixtures of sodium carbonate with calcium hypochlorite of high purity and stability. Such compositions yield solutions containing sodium hypochlorite when dissolved in water and are of improved stability, particularly as compared to similar mixtures in which ordinary bleaching powder is employed.

I have now found, however, that the alkali metal fluorides have several important advantages when used in admixture with calcium hypochlorite or bleaching powder to form compositions adapted to yield solutions of alkali metal hypochlorites when dissolved in water.

The improved composition of the present invention is made up of a substantially dry mixture of an alkali metal fluoride, such as sodium fluoride, and a calcium compound of hypochlorous acid, such as bleaching powder or calcium hypochlorite. The amount of alkali metal fluoride is advantageously somewhat in excess of that necessary to react with all of the calcium present; this excess may amount for example to about 5% or 10%.

The alkali metal fluorides apparently do not increase the instability of ordinary bleaching powder when mixed with it, so that in this respect the invention makes it possible satisfactorily to employ compositions containing ordinary bleaching powder without difficulties due to decomposition, particularly as compared with ordinary bleaching powder.

The alkali metal fluorides are also used with advantage, in accordance with the present invention, in connection with calcium hypochlorite products relatively free from calcium chloride. For example, calcium hypochlorite products such as those described in United States Letters Patent Nos. 1,481,039 and 1,481,040 or in applications Serial Nos. 746,667, 51,863, 51,864 and 58,118 may be used with advantage in the improved compositions of this invention. Similarly, basic calcium hypochlorite products may also be used.

When such mixtures of sodium fluoride and a calcium compound of hypochlorous acid are dissolved in water, a solution of sodium hypochlorite containing calcium fluoride in suspension is formed. The insoluble calcium fluoride may be separated, for example by filtration or decantation, or in some cases it may be permitted to remain in suspension in the solution.

If free lime is present in the calcium compound of hypochlorous acid, an equivalent amount of sodium hydroxide will be formed. Where this is objectionable, acids or acid salts, such as boric acid or sodium bicarbonate, may be added to control alkalinity due to this cause. The amount of such acid or acid salt, for example, may be regulated to render the resulting solution neutral or acid or of reduced alkalinity. In general, some alkalinity assists in making the solution more stable.

The new compositions of the invention are of general use in the production of solutions of alkali metal hypochlorites, and enables the production of solutions of any desired strength. The improved compositions can thus be used in making solutions for surgical purposes, or for making solutions for other purposes, such as disinfection in dairies and in households, for use in laundries and for textile bleaching, etc., as well as for medical and pharmaceutical purposes.

The new compositions of the present invention are of improved stability. They are, for example, more stable than corresponding mixtures in which the fluoride is replaced with the corresponding carbonate. While I do not predicate the invention upon any particular explanation, it seems that this improved stability may be due to the elimination of the more or less volatile acid-forming constituent, carbon dioxide.

For use in the presence of soap solutions, the composition of the present invention has several further special advantages. The solution of the alkali metal hypochlorite containing suspended calcium fluoride produced by dissolving the compositions in water can be used directly in the presence of soap solutions without separation of the precipitated calcium salt with the destruction of a minimum of soap. The amount of soap destroyed, for example, is very much less than that destroyed in an equivalent suspension made by dissolving a similar mixture in which the fluoride is replaced by the corresponding carbonate. In laundry work, for example, or in other cases where the presence of suspended calcium fluoride is not objectionable, the compositions of the invention have the important practical advantage of eliminating complications due to a necessity for removal of precipitated insoluble matter.

With further reference to use in connection with soap solutions, the compositions of the present invention have the general advantage of improved economy as to soap since under any particular conditions the compositions of the present invention entail the destruction of but a minimum of soap, for example, much less than is involved in the use of mixtures in which the fluoride is replaced by the corresponding carbonate under the same conditions. The calcium fluoride formed when the compositions of this invention are dissolved in water is relatively insoluble as compared to calcium carbonate. The use of an excess of the alkali metal fluoride also assists in reducing soap destructions.

In another aspect, this invention provides an improved method of making solutions of alkali metal hypochlorites comprising reacting upon solutions containing calcium compounds of hypochlorous acid, such as those described above, with the fluoride of the alkali metal. Solutions so prepared are of improved purity due to the greater insolubility of calcium fluoride and more complete separation of the calcium present as a precipitate can be effected. In carrying out the process of the invention, the alkali metal fluoride and the calcium compound of hypochlorous acid may be admixed and the mixture dissolved in water or these compounds may be brought into reaction in water after separate addition thereto. The solutions so prepared have the several advantages above discussed.

I claim:

1. A composition comprising a substantially dry mixture containing sodium fluoride and calcium hypochlorite.

2. A composition comprising a substantially dry mixture containing calcium hypochlorite and sodium fluoride in amount in excess of that necessary to react with all calcium present.

3. A composition comprising a substantially dry mixture containing a fluoride of an alkali metal and a calcium compound of hypochlorous acid.

4. A composition comprising a substantially dry mixture containing a calcium compound of hypochlorous acid and an amount of an alkali metal fluoride in excess of that necessary to react with all calcium present.

5. A composition comprising a substantially dry mixture containing a calcium compound of hypochlorous acid and an alkali metal salt which will react with the calcium compound in solution to form a calcium compound less soluble in the solution than calcium carbonate.

6. An improved method of making solutions containing alkali metal hypochlorites, comprising reacting upon a calcium compound of hypochlorous acid with the fluoride of the alkali metal in the presence of water.

7. A composition comprising a substantially dry mixture containing sodium fluoride, calcium hypochlorite and an acid compound.

In testimony whereof I affix my signature.

MAURICE C. TAYLOR.